(12) United States Patent
Hutchins

(10) Patent No.: US 7,124,715 B2
(45) Date of Patent: Oct. 24, 2006

(54) ENGINE COOLING SYSTEMS

(75) Inventor: William R. Hutchins, Kenilworth (GB)

(73) Assignee: Ford Global Technologies, LLC, Dearborn, MI (US)

( * ) Notice: Subject to any disclaimer, the term of this patent is extended or adjusted under 35 U.S.C. 154(b) by 179 days.

(21) Appl. No.: 10/835,690

(22) Filed: Apr. 30, 2004

(65) Prior Publication Data
US 2004/0216700 A1 Nov. 4, 2004

(30) Foreign Application Priority Data
May 2, 2003 (GB) .................................. 0310120

(51) Int. Cl.
F01P 7/16 (2006.01)
(52) U.S. Cl. ................. 123/41.1; 123/41.05; 123/41.51
(58) Field of Classification Search ............... 123/41.1, 123/41.05, 41.09, 41.51
See application file for complete search history.

(56) References Cited
U.S. PATENT DOCUMENTS

| | | | |
|---|---|---|---|
| 4,580,531 A * | 4/1986 | N'Guyen | 123/41.1 |
| 4,875,437 A | 10/1989 | Cook et al. | |
| 5,727,729 A | 3/1998 | Hutchins | |
| 5,979,778 A | 11/1999 | Saur | |
| 6,065,682 A | 5/2000 | Frunzetti | |
| 6,196,168 B1 | 3/2001 | Eckerskorn et al. | |
| 6,481,387 B1 * | 11/2002 | Sano | 123/41.1 |
| 6,595,164 B1 * | 7/2003 | Kunze et al. | 123/41.1 |
| 6,644,248 B1 * | 11/2003 | Luckner et al. | 123/41.1 |
| 6,837,193 B1 * | 1/2005 | Kobayashi et al. | 123/41.1 |
| 2001/0010210 A1 * | 8/2001 | Chamot et al. | 123/41.1 |
| 2002/0189555 A1 * | 12/2002 | Murakami et al. | 123/41.1 |
| 2004/0163612 A1 * | 8/2004 | Takahashi | 123/41.1 |

FOREIGN PATENT DOCUMENTS

| | | |
|---|---|---|
| EP | 0587981 | 8/1996 |
| EP | 1024256 | 8/2000 |
| EP | 0794327 | 8/2003 |
| EP | 0794327 | 10/2003 |
| GB | 2394537 | 4/2004 |

* cited by examiner

Primary Examiner—Stephen K. Cronin
Assistant Examiner—Jason Benton
(74) Attorney, Agent, or Firm—Diana D. Brehob

(57) ABSTRACT

An engine cooling system has a primary cooling circuit having with a coolant pump to pump coolant to the engine, an engine return line, a radiator and a bypass in parallel with the radiator. The primary circuit also has a flow control valve to control flow between the radiator and the bypass to allow fluid to flow from the radiator only when coolant temperature is above normal operating temperature. The system also has a secondary cooling circuit with a heat exchanger and a temperature responsive control valve and a heater circuit connected to a passenger compartment heater. The temperature responsive conrol valve shuts off flow through both or one of the inlets depending on coolant temperature.

28 Claims, 7 Drawing Sheets

ENGINE COOLING SYSTEMS

FIELD OF THE INVENTION

This invention relates to engine cooling systems particularly, but not exclusively, for motor vehicles.

BACKGROUND OF THE INVENTION

Typically, an engine cooling system comprises a primary cooling circuit having a pump to circulate coolant used to cool the engine and a radiator to cool the coolant. However, coolant heated by the engine can be used for heating purposes, typically a passenger compartment heater for occupants of a vehicle. Also, the engine coolant may be used in a secondary cooling circuit to cool one or more auxiliary heat exchangers such as a transmission oil cooler, an engine oil cooler, a fuel cooler or an air-charge cooler.

It can be advantageous, particularly in the case of a transmission oil cooler, if the coolant circulating through the cooling system can be used to provide heat to the auxiliary heat exchanger. In the case of the transmission oil cooler, this warms the transmission directly after engine start up so as to enable the transmission to reach its maximum operating efficiency as soon as possible. When the transmission has warmed up the coolant can then be used to prevent overheating of the transmission oil, particularly when the transmission is under heavy load. However upon start up from cold, it is also desirable to ensure that any passenger compartment heater which uses the engine coolant as a source of heat is heated as soon as possible. It is therefore desirable to provide some means of ensuring prompt passenger compartment warm up while utilizing any spare heat from the engine for an auxiliary heat exchanger.

It is an object of this invention to provide an engine cooling system that is able to maximize its heating performance in the period after start up from ambient while also using excess heat to warm a secondary coolant flowing to an auxiliary heat exchanger.

SUMMARY OF THE INVENTION

According to a first aspect of the invention there is provided an engine cooling system having a primary cooling circuit having a radiator and a pump used to circulate coolant through the engine to the radiator and back to the engine, the radiator being connected to an engine return line connecting the radiator to the engine and to the pump through a primary flow control valve and a pump return line, the primary flow control valve being also connected to the engine return line upstream from the radiator and being operable to allow fluid to flow from the radiator only when the sensed temperature of the coolant is above a normal running temperature of the engine. The cooling system also has a secondary cooling circuit comprising a heat exchanger connected to the pump return line and to a temperature responsive control valve, the temperature responsive control valve having a first inlet connected to the engine return line upstream from the radiator, a second inlet connected to the outlet side of the radiator and an outlet which is connected to the heat exchanger, and a heater circuit. The heater circuit includes a passenger compartment heater connected to receive coolant heated by the engine and return it to the pump return line. The temperature responsive control valve is operable, depending upon the sensed temperature of the coolant, to shut off flow through both of the inlets simultaneously, to shut off flow through the first inlet while permitting flow through the second inlet and to shut off flow through the second inlet while permitting flow through the first inlet. In one embodiment, the heat exchanger of the secondary circuit is a transmission oil cooler.

Preferably, control of the flow of coolant through the first and second inlets of the temperature responsive flow control valve is based on a sensed temperature which is combination of the temperatures of the coolant in the first and second inlets, in which case it is preferable that the temperature of the coolant in the first inlet is dominant in the control of coolant through the first and second inlets at all times. Preferably, the sensed temperature is equal to $X*T_1+Y*T_2$ where X is between 0.75 and 0.95, Y is between 0.25 and 0.05, $T_1$ is the temperature of the coolant in the first inlet and $T_2$ is the temperature of the coolant in the second inlet.

Preferably, when the sensed temperature is below a first predetermined temperature, the temperature responsive control valve is operable to shut off flow from the first and second inlets to the outlet, in which case, when the sensed temperature is above the first predetermined temperature but below a second higher pre-determined temperature, the temperature responsive control valve may be operable to permit coolant to flow from the first inlet to the outlet while preventing any significant flow from the second inlet to the outlet. Furthermore, when the sensed temperature is above the second pre-determined temperature but below a third higher predetermined temperature, the temperature responsive control valve may be operable to allow coolant to flow from the first inlet and the second inlet to the outlet. Indeed, when the sensed temperature is above the third predetermined temperature, the temperature responsive control valve may be operable to prevent any significant flow from the first inlet to the outlet while allowing coolant to flow from the second inlet to the outlet. Preferably, the first pre-determined temperature is lower than the normal running temperature of the engine. Also, the third predetermined temperature is preferably below or equal to the normal running temperature of the engine.

Conveniently, the temperature responsive control valve is operable to allow coolant to flow from the first inlet to the outlet irrespective of the sensed temperature if the pressure difference between the first inlet and the outlet exceeds a pre-determined magnitude.

In a preferred arrangement, the temperature responsive control valve comprises a housing defining the first inlet, the second inlet, the outlet, a valve chamber, a temperature responsive member in the valve chamber, a first valve member for controlling the flow of coolant through the first inlet and a second valve member for controlling the flow of coolant through the second inlet, in which case the first valve member may be axially moveable between two limits so that at or near one limit of axial movement it is operable to prevent coolant flow from the first inlet to the outlet, at or near the other limit of axial movement it is operable to prevent coolant flow from the first inlet to the outlet but for the majority of the axial movement between these limits it is arranged to permit coolant to flow from the first inlet to the outlet. The first valve member may be biased towards the second inlet.

Conveniently, the first valve member is a tubular member having a bore defining a coolant flow passage for coolant from the first inlet. The temperature responsive member may have a valve body having the second valve member, a pushrod actuated by a temperature responsive means in the valve body against an abutment in the second inlet, biasing means being provided to bias the second valve member towards the second inlet. The valve body may be located in the bore of the first valve member so as to ensure that the temperature responsive member is primarily controlled by the temperature of the coolant in the first inlet.

A retainer member may be secured in the housing adjacent the second inlet to retain the first valve member and the temperature responsive member within the valve chamber and in such an arrangement the retainer member may define a cylindrical bore in which the second valve member is a sliding fit, the arrangement being such that when the second valve member is fully engaged with the cylindrical bore no significant coolant flow can pass by the second valve member from the second inlet to the outlet. The retainer member may include a support member which forms the abutment for the pushrod of the temperature responsive member.

The retainer member may have an annular end face facing into the valve chamber for cooperation with a complementary annular end face on the first valve member, the arrangement being such that when the annular end face of the first valve member is in abutment with the annular end face of the retainer member no coolant can flow from the bore of the first valve member to the outlet. Preferably, spacers are interposed between the annular end face of the first valve member and the second valve member so as to define radial flow passages, the arrangement being such that when the annular end face of the first valve member is moved away from the annular end face of the retainer member coolant can flow from the bore of the first valve member through the radial passages to the outlet. The spacers may be in the form of projections formed around the inner perimeter of the annular end face of the first valve member.

The first inlet may have a plug for engagement with the bore of the first valve member, the arrangement being such that when the plug is engaged with the bore in the first valve member no coolant can flow from the first inlet into the bore of the first valve member. Where biasing means are provided to bias the second valve member towards the second inlet, such biasing means may be a spring which is located at one end by the plug.

In a preferred arrangement of the cooling system, the radiator has a main cooler and a sub-cooler both connected on an inlet side to the engine return line, the main cooler having an outlet side connected through a radiator return line to the primary flow control valve and the sub-cooler having an outlet side connected to the second inlet of the temperature responsive control valve. Under full flow conditions, the pressure drop across the sub-cooler may be considerable less than the pressure drop across the main cooler.

The invention also provides, according to a second aspect thereof, a temperature responsive control valve for use in a motor vehicle cooling system according to said first aspect, the temperature responsive control valve having a first inlet which in use is connected to the engine return line upstream from the radiator, a second inlet which in use is connected to the outlet side of the radiator and an outlet which in use is connected to the heat exchanger.

BRIEF DESCRIPTION OF THE FIGURES

The invention will now be described by way of example with reference to the accompanying drawings, of which.

DETAILED DESCRIPTION

Figure 1:
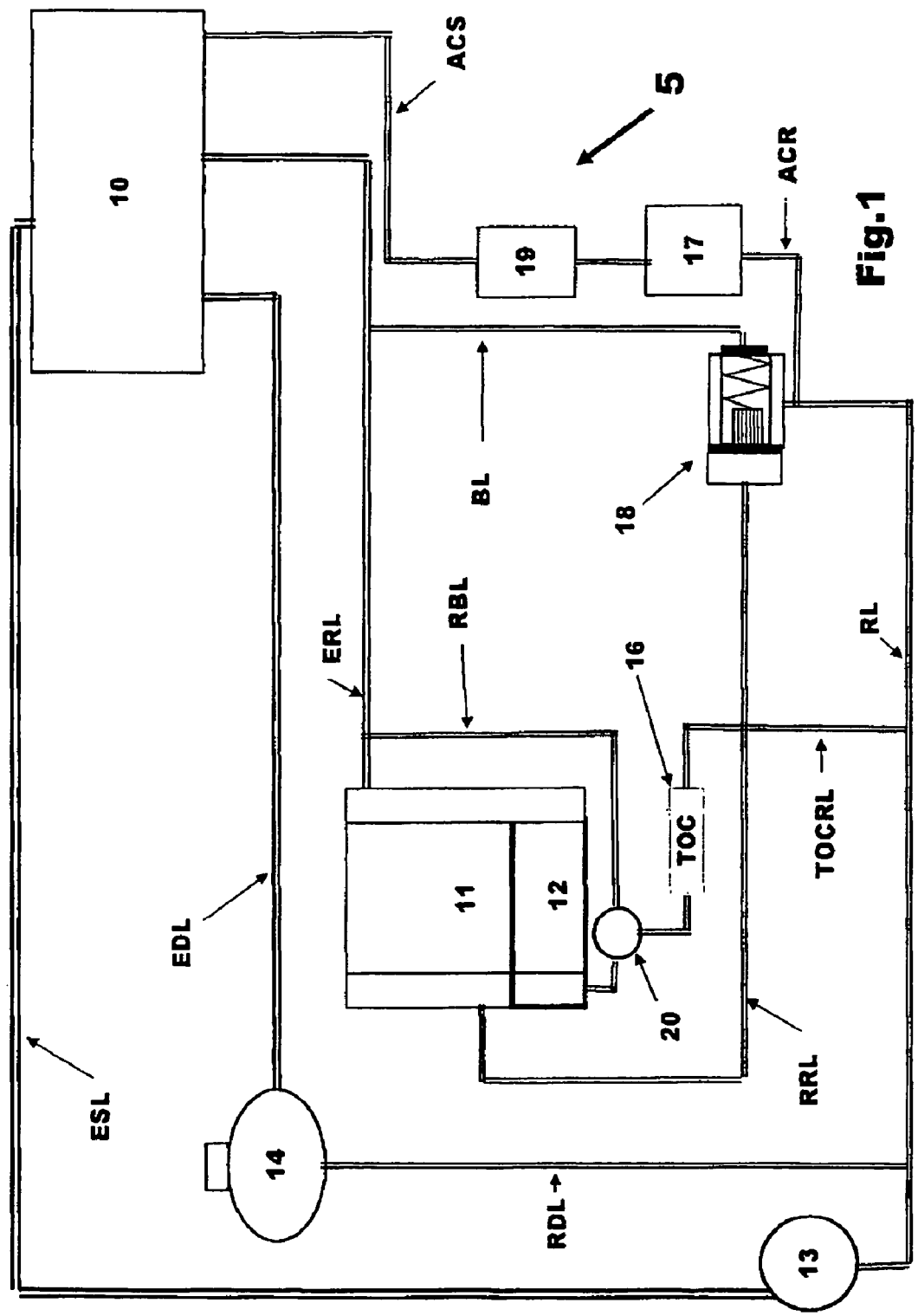
FIG. 1 is a diagrammatic representation of an engine cooling system according to the invention.

With particular reference to FIG. 1, an engine cooling system 5 for a motor vehicle comprises a primary cooling circuit having a radiator 11 which includes a main portion 11A for cooling the coolant for an engine 10. A pump 13 circulates the coolant through an engine supply line ESL to the engine 10 and through an engine return line ERL to the radiator main portion 11A and back to the pump 13. A secondary cooling circuit includes at least one auxiliary heat exchanger 16, which in this case is a transmission oil cooler but could be for a different purpose, e.g. an engine oil cooler or a combination of heat exchangers. A heater circuit supplies coolant to a cabin heater 17 and an exhaust gas recirculation heat exchanger 19 through an auxiliaries cooler supply line ACS and an auxiliaries cooler return line ACR. The secondary cooling circuit is arranged to extract coolant from the primary cooling circuit at a position prior to entry to the radiator main portion 11A and pass the extracted coolant through a temperature responsive control valve 20 to the oil cooler 16 and return coolant to the primary circuit upstream of the pump 13.

The temperature responsive control valve 20 is more conveniently referred to as the oil cooler mixer valve and is described in more detail with reference to FIGS. 2 to 7. It includes a first or hot inlet 21 (FIG. 2) for the coolant extracted from the primary cooling circuit prior to entry to the radiator main portion 11A and a second or cold inlet 22 connected to a sub-cooler 12 forming part of the radiator 11 to selectively supply cooled coolant to an outlet 23 connected to the transmission oil cooler 16. Flow from the transmission oil cooler 16 is returned to the pump 13 through a transmission oil cooler return line TOCRL and a pump return line RL. The sub-cooler 12 is connected to the same inlet as the main portion 11A of the radiator 11 but, because of its construction and the lower flow rate through the secondary circuit, the pressure drop across the sub-cooler 12 is approximately significantly less than across the radiator main portion 11A.

Coolant for the heater circuit is extracted from the engine 10 directly as shown. However, coolant may alternatively be extracted from the primary cooling circuit at any position prior to the position where a bypass line 'BL' is connected to a primary flow control valve 18 so that the heater circuit is continuously connected to a source of warm coolant from the engine 10. The primary flow control valve 18 is usually simply referred to as the thermostat but here will be referred to as the main thermostat 18 to avoid confusion with the oil cooler mixer valve 20. Primarily, the main thermostat 18 controls the flow to the radiator main portion 11A, preventing flow until the engine 10 has reached an appropriate running temperature. However, as with most valves of this type, the main thermostat 18 also controls the flow in the bypass line BL. An appropriate main thermostat 18 is described in EP-A-0794327.

The bypass flow line BL is arranged in parallel to the radiator 11 between the engine return line ERL and the main thermostat 18. Coolant that has been cooled by the main cooler 11A of the radiator 11 exits from the cold end of the radiator 11 and passes along a radiator return line RRL to the main thermostat 18 and then back to the pump 13 through the pump return line RL. The expansion tank 14 is connected to the engine 10 by an engine degas line EDL and is also connected to the pump return line RL by a return degas line RDL.

The secondary cooling circuit includes the transmission oil cooler 16 and the oil cooler mixer valve 20. The hot inlet 21 of the oil cooler mixer valve 20 is connected by means of a radiator bypass line RBL to the engine return line ERL at a position on the inlet side of the radiator 11 so that the oil cooler mixer valve 20 can receive hot coolant from the engine 10. The cold inlet 22 of the oil cooler mixer valve 20 is connected to an outlet from the sub-cooler 12 so that the oil cooler mixer valve 20 can receive a flow of cooled coolant. During full flow conditions the temperature of the coolant leaving the sub-cooler 12 is not as low as that leaving the main portion of the radiator. However, it is much lower than the temperature of the coolant entering the radiator 11 and is at a greater pressure than the coolant leaving the main portion of the radiator 11. This is because of the lower pressure drop across the sub-cooler 12 when compared to the main cooler. In a typical example, the pressure difference between the outlet from the main cooler and the return line RL to the pump is approximately 20 to 30 KPa whereas the pressure difference between the outlet from the sub-cooler 12 and the return line RL is approximately 40 to 45 KPa. This is significant because, with a typical example of the oil cooler 16, a pressure difference of 20–30 KPa is only just sufficient to provide flow through the oil cooler 16 and results in poor oil cooler performance whereas a pressure difference of 40–45 KPa provides good flow through the oil cooler and maximizes its efficiency.

The outlet 23 from the oil cooler mixer valve 20 is connected to an inlet to the transmission oil cooler 16 and an outlet from the transmission oil cooler 16 is connected through a transmission oil cooler return line TOCRL to the return line to the pump 13.

With particular reference to FIGS. 2 to 7 the oil cooler mixer valve 20 includes a one-piece T-shaped plastics housing 25 defining the hot inlet 21, the cold inlet 22, the outlet 23 outlet and a valve chamber 24. A first valve member 40 is provided for controlling the flow of coolant through the hot inlet 21 and a second valve member 50 is provided for controlling the flow of coolant through the cold inlet 22. A temperature responsive actuator 30 is located within the valve chamber 24 and has an actuator body 31, a temperature responsive means such as wax housed within the body 31 and a pushrod 32 extending from one end of the body 31. Such temperature responsive actuators are common in engine cooling systems. Normally they are simply known as thermostat capsules and this term will be used for convenience. The pushrod 32 cooperates with an abutment located in the cold inlet 22 to urge the capsule body 31 away from the cold inlet 22 when the sensed temperature increases and biasing means in the form of a helical spring 33 acts to bias the valve body 31 in the opposite direction. In this particular example, the second valve member 50 is an annular washer of brass soldered to the capsule body 31 near to the end of the capsule body 31 from which extends the pushrod 32. The spring 33 provides a force of approximately 25N to the capsule body 31 when the second valve member 50 is in a fully closed position.

The first valve member 40 is axially moveable between two limits to control the flow of coolant from the hot inlet 21 to the outlet 23 and the second valve member 50 controls the flow of coolant from the cold inlet 22 to the outlet 23. One limit of axial movement of the first valve member 40 is the position at which it is nearest to the cold inlet 22 where it is can prevent coolant flow from the hot inlet 21 to the outlet 23. The other limit of axial movement of the first valve member 40 is the position at which it is nearest to the hot inlet 21 and at or near this position it prevents coolant flow from the hot inlet 21 to the outlet 23. However, for the majority of the axial movement in between these limits of axial movement the first valve member 40 is arranged to permit coolant to flow from the hot inlet 21 to the outlet 23.

The first valve member 40 is in the form of a tubular valve spool 41, having a bore 42 defining a coolant flow passage, and is biased towards the cold inlet 22 by a helical spring 43. The body 31 of the thermostat capsule 30 is positioned within the bore 42 of the valve spool 41, thereby helping to ensure that the thermostat capsule 30 is primarily controlled by the temperature of the coolant in the hot inlet 21. The valve spool 41 has a stepped outer cylindrical surface forming first and second cylindrical portions 44 and 45 and an annular flange 46 at an end of the second cylindrical portion 45 to abut the helical spring 43. The opposite end of the helical spring 43 reacts against an annular surface of the housing 25 in the valve chamber 24. The annular flange 46 forms part of an annular end face 47 which can abut an annular end face 61 of a retainer member 60 so that when the two annular surfaces are in contact substantially no coolant can flow from the bore 42 of the valve spool 41 to the outlet 23.

The helical spring 43 has a spring rate and pre-load chosen to allow the valve spool 41 to be moved towards the hot inlet 21 when the pressure in the hot inlet 21 exceeds a pre-determined magnitude irrespective of the temperature of the coolant in the hot and cold inlets 21 and 22. In the present example, the helical spring 43 provides a force of approximately 20N to the valve spool 41 when the valve spool 41 is closest to the cold inlet 22.

The first cylindrical portion 44 of the valve spool 41 can slide in a cylindrical bore 26 formed in the housing 25 between the valve chamber 24 and the hot inlet 21. The housing 25 has a plug 27 adjacent the hot inlet 21 for engagement with the bore 42 of the valve spool 41, the arrangement being such that, when the plug 27 is engaged with the bore 42 in the valve spool 41 to a significant extent, no coolant can flow from the hot inlet 21 into the bore 42 of the valve spool 41. The plug 27 has a tubular end portion 28 for engagement with the bore 42 of the valve spool 41 and a cylindrical recess 29 to accommodate one end of the spring 33 used to bias the capsule body 31 towards the cold inlet 22. As best seen with reference to FIG. 6, the plug 27 is connected in the main body of the housing 25 by four spokes 36 which define four inlet ports 37 connecting the hot inlet 21 to the valve chamber 24.

Figure 7:
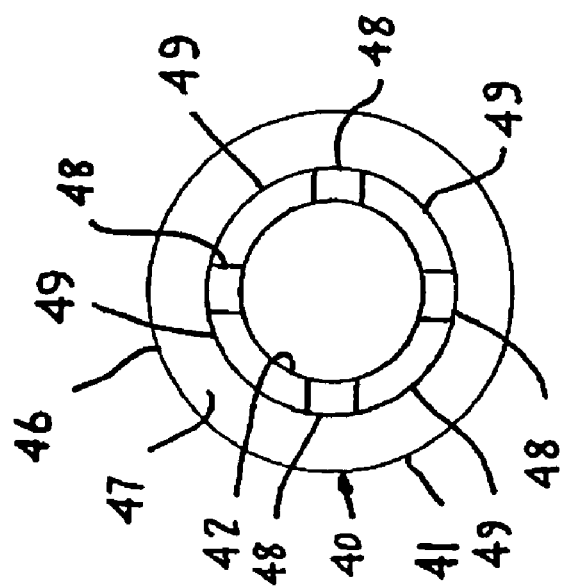
FIG. 7 is an end view of a valve member forming part of the valve shown in FIG. 2 as viewed from a cold flow inlet.
Figure 6:
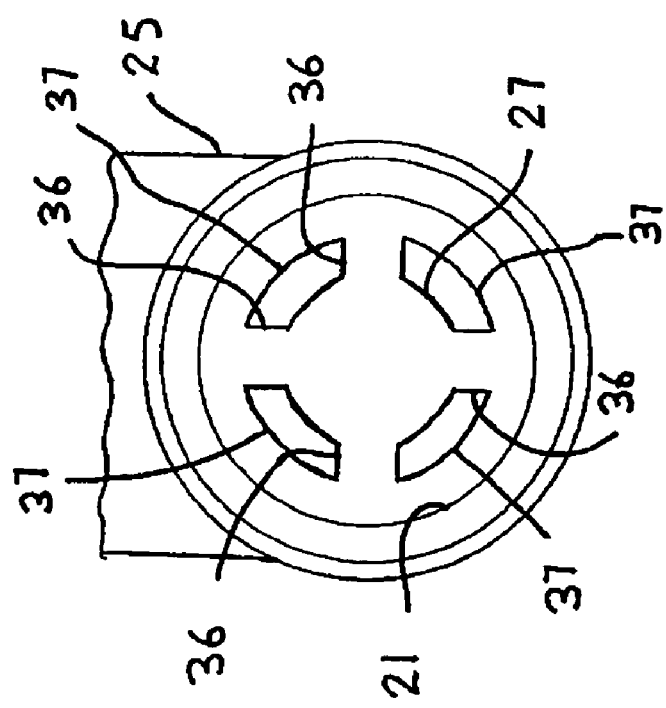
FIG. 6 is an end view of a hot flow inlet of the valve shown in FIG. 2.

Spacers 48 positioned between the annular end face 47 of the first valve member 21 and the second valve member define radial passages 49 which allows flow from the bore 42 of the valve spool 41 to the outlet 23 when the annular end face 47 of the first valve member 21 is moved away from the annular end face 61 of the retainer member 60. The spacers 48, as seen better in FIG. 7, are in the form of projections 48 formed around the inner perimeter of the annular end face 47 as an integral part of the valve spool 41. However, the spacers could be formed as part of the second valve member 50 or could be formed as a separate component which is attached to either of the first and second valve members 40 and 50. Preferably, the projections 48 fit within a bore 62 in the retainer member 60 when the valve spool 41 is in abutment with the annular end face 61 of the retainer member 60 to help locate the valve spool 41.

The retainer member 60 has two axially extending arms 63 each having a radially extending peg (not shown) which engages a respective J-shaped slot 25a in the housing 25 surrounding the cold inlet 22 to form a bayonet connection to secure the retainer member 60 within a bore of the housing 25 which forms the cold inlet 22. The outer cylindrical surface of the housing 25 surrounding the cold inlet 22 normally provides a connection for a hose connecting it to the sub-cooler 12 and the slots 25a are normally covered by this hose in a leak proof manner. The retainer member 60 also includes a support member 64 forming an abutment for the pushrod 32 of the thermostat capsule 30. The support member 64 includes a central platform connected to the bore 62 of the retainer member 60 by four radial spokes, which define four inlet ports connecting the cold inlet 22 to the valve chamber 24.

The second valve member 50 is a sliding fit in the bore 62 such that when the second valve member 50 is engaged within the bore 62 virtually no coolant can pass from the cold inlet 22 to the outlet 23. There is no need for elastomeric seals between the second valve member and the bore and no need to produce an accurately formed bore for the cold inlet 22 so that this bore can remain in an "as molded" condition without a need for machining.

Operation of the primary cooling circuit is generally conventional. When the engine 10 is started from cold it is desirable to increase its temperature as quickly as possible to reduce emissions and also to increase fuel economy. Therefore, during initial running of the engine, the main thermostat 18 is arranged to prevent coolant flow through the radiator 11 while allowing flow through the bypass line BL. Since no coolant flows through the radiator 11, there is very little cooling effect upon the coolant and it will rapidly increase in temperature from ambient. Once the engine 10 has been operated for a sufficient period for it to have reached normal operating temperature, the main thermostat 18 starts to close off the bypass line BL and allows coolant to begin flowing through the main portion of the radiator 11.

Operation of the secondary cooling circuit is generally dependent on the operation of the oil cooler mixer valve 20 which will be described in more detail later. However, it will be appreciated that hot inlet 21 of the oil cooler mixer valve 20 can receive hot coolant from the engine 10 from the engine return line ERL and the cold inlet 22 can receive a flow of cooled coolant from the sub-cooler 12. During full flow conditions the temperature of the coolant leaving the sub-cooler 12 is not as low as that leaving the main portion 11A of the radiator 11 through the radiator return line RRL. However, it is much lower than the temperature of the coolant entering the radiator 11 and is at a greater pressure than the coolant leaving the main portion of the radiator 11. This is because of the lower pressure drop across the sub-cooler 12 when compared to the main cooler. In a typical example, the pressure difference between the outlet from the main cooler and the return line RL to the pump is approximately 20 to 30 KPa whereas the pressure difference between the outlet from the sub-cooler 12 and the return line RL is approximately 40 to 45 KPa. This is significant because, with a typical example of the oil cooler 16, a pressure difference of 20–30 KPa is only just sufficient to provide flow through the oil cooler 16 and results in poor oil cooler performance whereas a pressure difference of 40–45 KPa provides good flow through the oil cooler and maximizes its efficiency.

Figure 2:
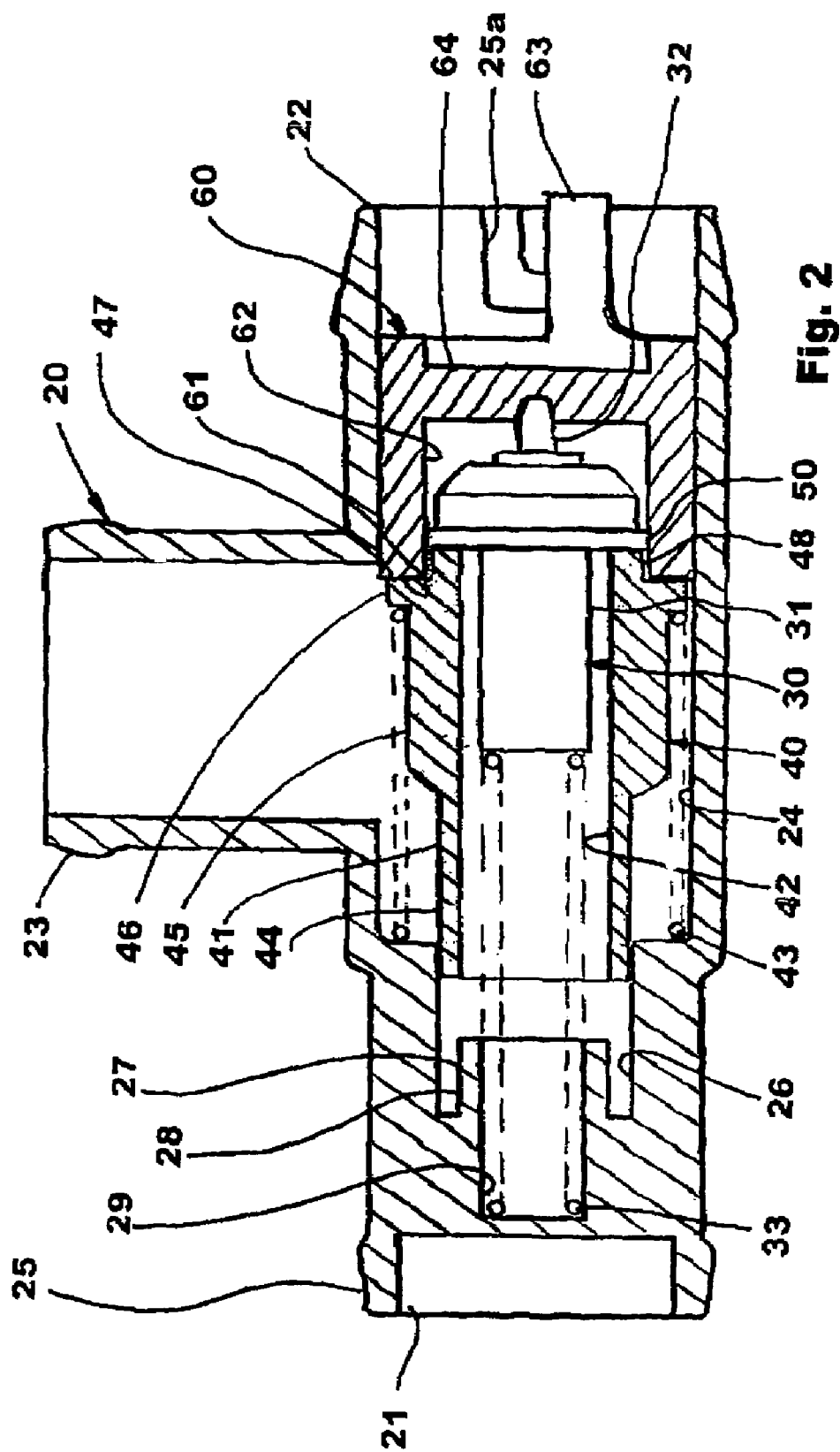
FIG. 2 is a cross-section through a temperature responsive control valve used in the cooling system shown in FIG. 1, the valve being shown in a closed state.
Figure 3:
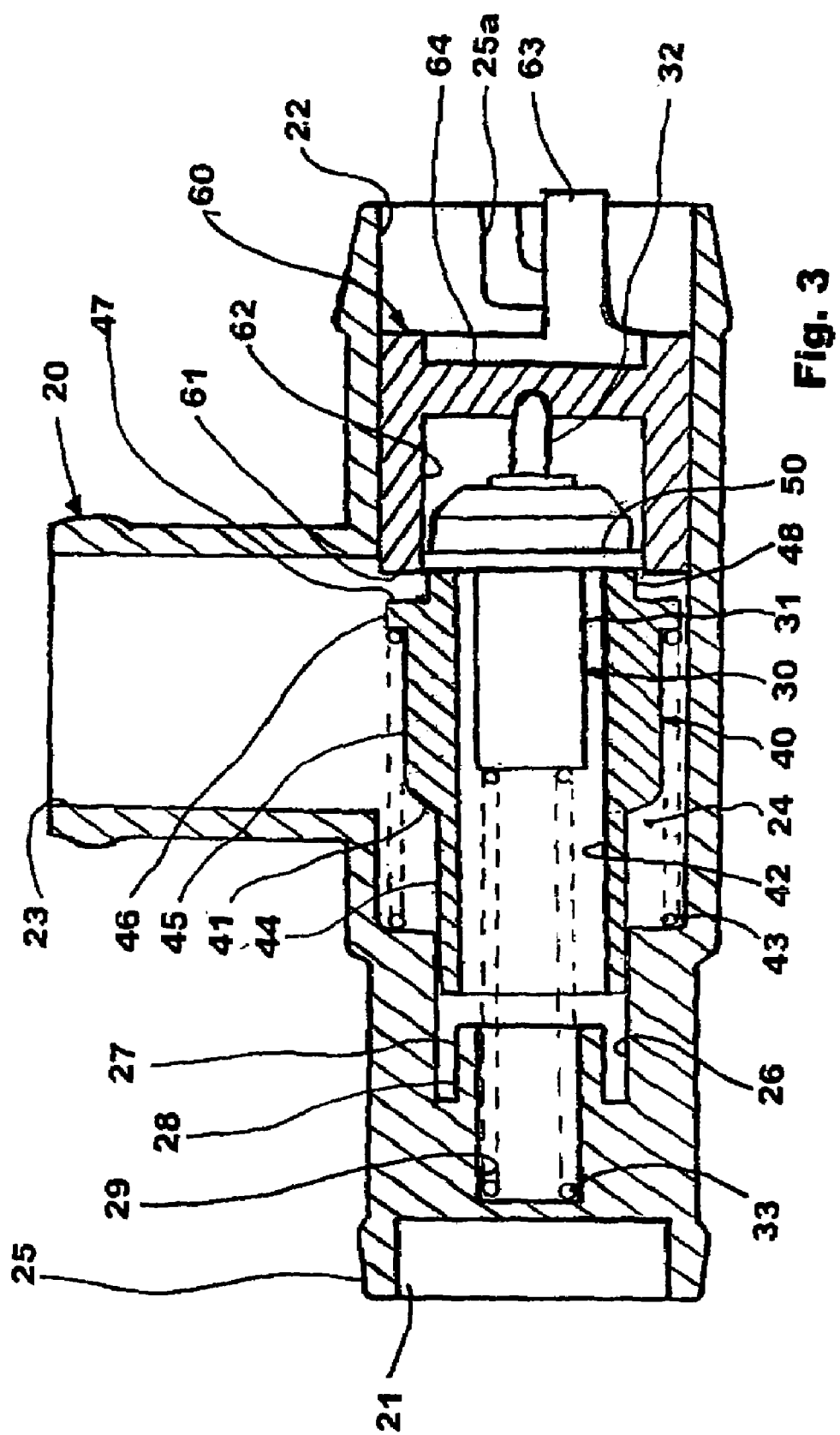
FIG. 3 is cross-section similar to that of FIG. 2 but showing the valve in a hot flow open and cold flow closed state.
Figure 4:
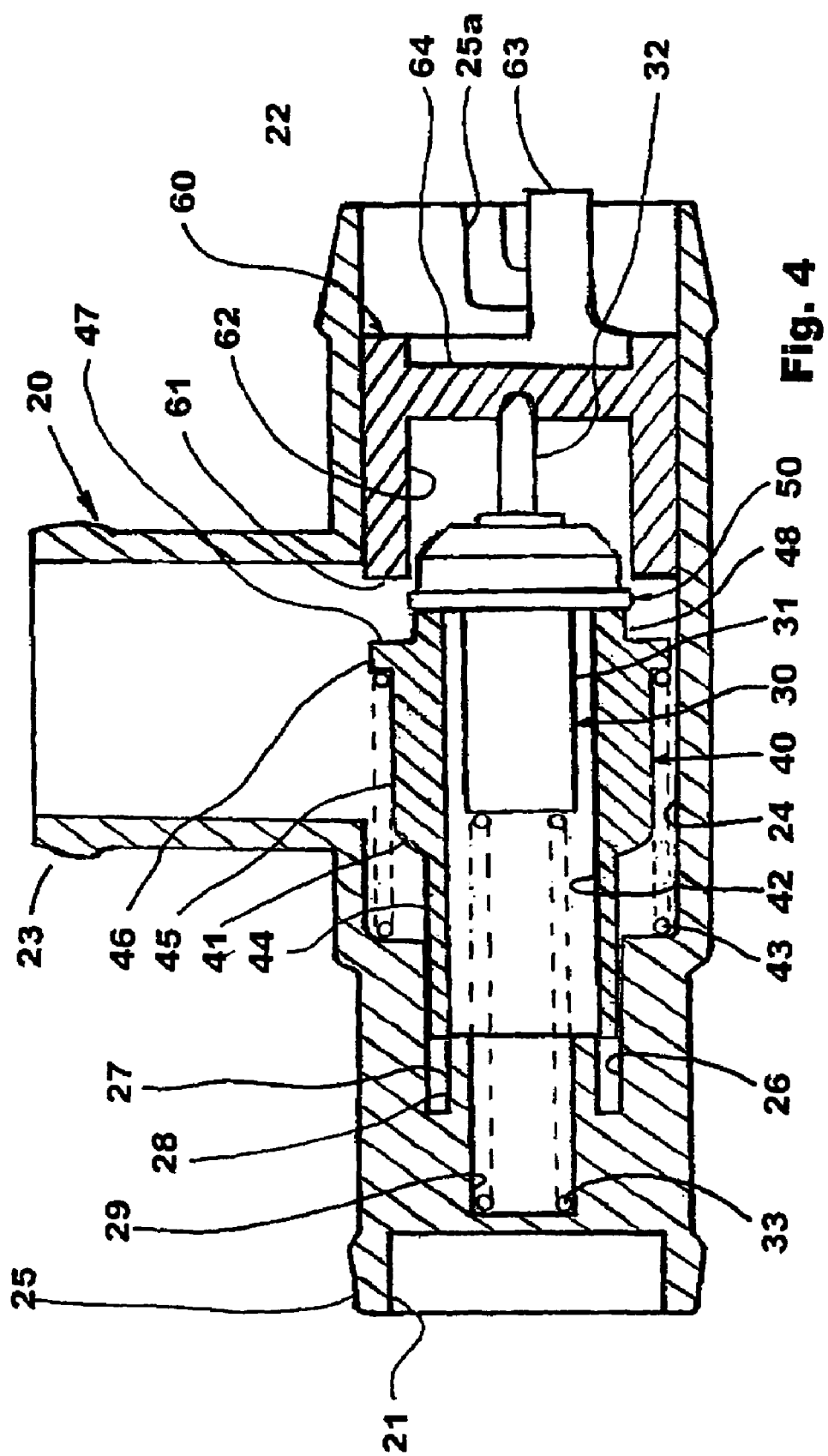
FIG. 4 is cross-section similar to that of FIG. 2 but showing the valve in a hot flow closed and cold flow open state.
Figure 5:
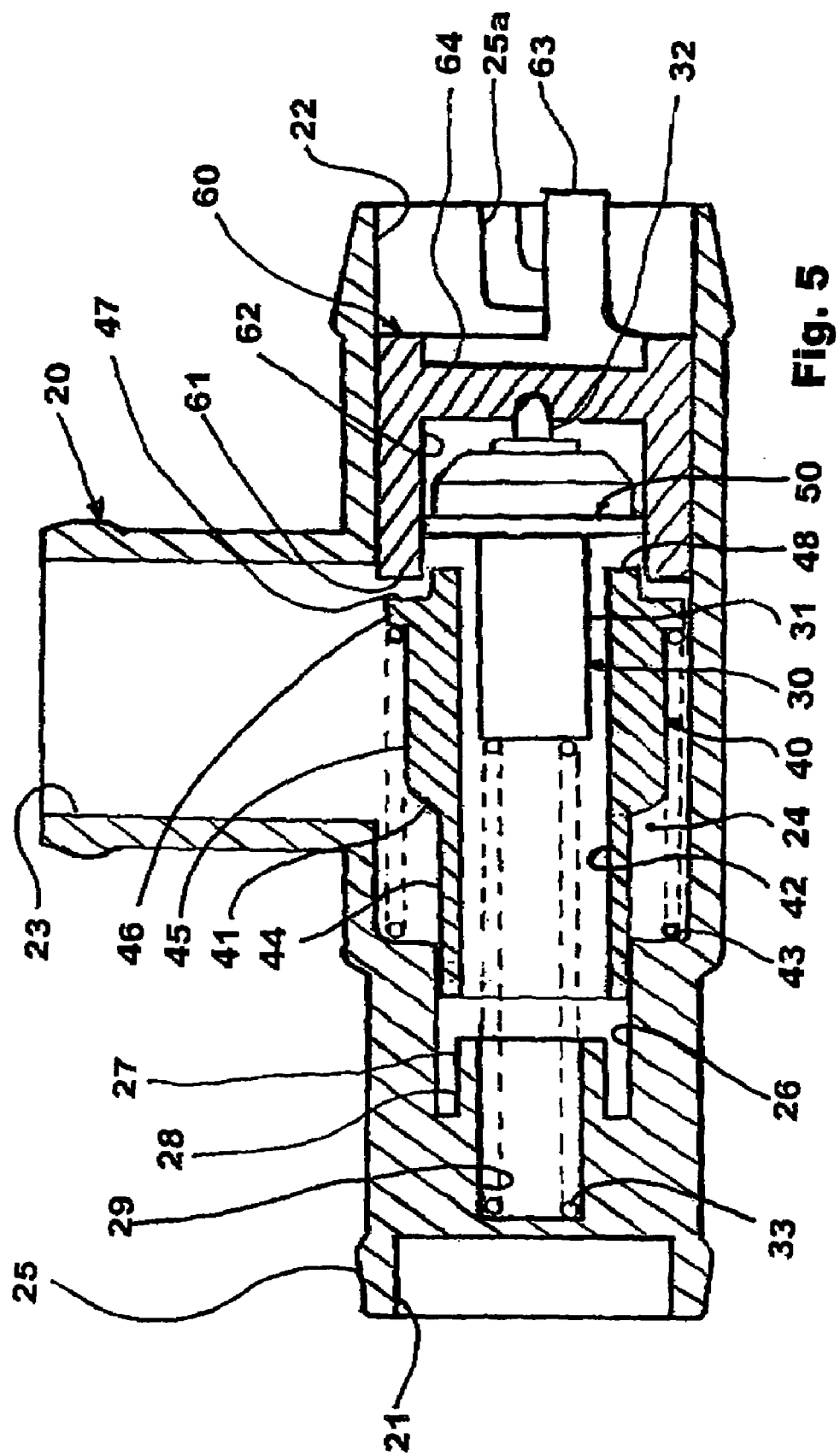
FIG. 5 is cross-section similar to that of FIG. 2 but showing the valve in a pressure bypass state.

Operation of the oil cooler mixer valve 20 will now be described with particular reference to FIGS. 2 to 5. FIG. 2 shows the position of the first and second valve members 40 and 50 when the combined temperature of the coolant in the hot and cold inlets is below a first predetermined temperature, in this case 80° C. In this state the oil cooler mixer valve 20 is operable to shut off flow from the hot and cold inlets 21 and 22 to the outlet 23, the annular end face 47 of the valve spool 41 being held against the annular face 61 of the retainer member 60 by the helical spring 43 while the second valve member 50 is fully engaged with the bore 62 in the retainer member 60. Because the pressure on both sides of the second valve member 50 is equal, there is no leakage from the cold inlet 22 to the outlet 23. However, there is a very small leakage from the hot inlet 21 through the valve spool 41 and past the interface between the abutting end faces 47 and 61 of the valve spool 41 and the retainer member 60. This is in the order of 200 cc per minute and is just sufficient to provide a hot flow from the engine return line ERL through the radiator bypass line RBL and the hot inlet 21 and ensure that the thermostat capsule 30 is able to accurately sense the coolant temperature. Indeed, if there was no flow, the temperature of the coolant in the hot inlet 21 would be much lower than the temperature of the coolant leaving the engine 10 because the coolant would be stagnant and lose heat to its surroundings.

As the engine 10 warms up the temperature in the hot inlet 21 rises accordingly and causes the thermostat capsule 30 to begin to react more strongly against the combined force applied by the two springs 33, 43. The thermostat capsule 30 has areas exposed to both the coolant from the hot inlet 21 and to the coolant from the cold inlet 22 so that the capsule 30 is sensitive to a combination of both these temperatures. This can be regarded as a combined temperature and, for the sake of convenience, will usually be referred to as the sensed temperature when discussing the operation of the thermostat capsule 30. When the sensed temperature reaches the first predetermined temperature the force supplied by the thermostat capsule 30 is sufficient to overcome the two springs 33, 43 and the annular end face 47 of the first valve member begins to move away from the annular face 61 of the retainer member 60. This allows coolant from the hot inlet 21 to begin to flow through the bore 42; through the radially extending passages 49 into the valve chamber 24 and out through the outlet 23.

As the coolant temperature continues to rise, the thermostat capsule 30 continues to move towards the hot inlet against the springs 33, 43. At a second pre-determined sensed temperature, in this case 85° C., the valve spool 41 is fully open and the second valve member 50 has reached the end of the bore 62 in the retainer member 60. This is the position shown in FIG. 3. In this position coolant can flow freely through the hot inlet 21 but the flow of coolant through the cold inlet is still restricted because of the engagement of the second valve member 50 with the bore 62.

A further small rise in the sensed temperature causes the second valve member 50 to begin to disengage with the bore 62 so that leakage of cold coolant from the cold inlet 22 past the second valve member 50 begins. The flow area is equal to the circumference of the second valve member 50 multiplied by the distance of the second valve member 50 from the end of the bore 62 which gives a very gentle transition from a closed condition to an open condition and helps to prevent thermal shock in the sub cooler 12 and the transmission oil cooler 16. Thus with the combined temperature of the coolant in the hot and cold inlets 21 and 22 is above the second higher pre-determined temperature, but below a third higher pre-determined coolant temperature which in this case is 90° C., the oil cooler mixer valve 20 is operable to allow coolant to flow from the hot inlet 21 and the cold inlet 22 to the outlet 23. The second valve member 50 is no longer engaged with the bore 62 of the retainer member 60 and the valve spool 41 is not in contact with the annular face 61 of the retainer member 60.

When the sensed temperature reaches a third pre-determined temperature, in this case 90° C., the oil cooler mixer valve 20 is operable to prevent any significant flow from the hot inlet 21 to the outlet 23 while allowing coolant to flow freely from the cold inlet 22 to the outlet 23. This is the position shown in FIG. 4. The plug 27 is just beginning to engage with the bore 42 of the first valve member and thus acts as a hot flow valve to prevent coolant entering the bore 42 from the hot inlet 21. For sensed temperatures above the third pre-determined temperature the plug 27 will become further engaged with the bore 42 until the thermostat capsule 30 runs out of movement.

Although the thermostat capsule 30 senses not only the temperature of the coolant in the hot inlet 21 but also the temperature of the coolant in the cold inlet 22, the main part of capsule body 31 which contains the wax is located within the bore 42 of the valve spool 41 so that the temperature of the coolant in the hot inlet 21 is dominant in the control of coolant through the hot and cold inlets 21 and 22 at all times. This helps to prevent instability when the cold inlet 22 opens, i.e. the inflow of cold coolant does not immediately reduce the sensed temperature so that the cold inlet is cut off.

The positioning of the second valve member 50 on the thermostat capsule 30 during manufacture influences how the two temperatures are combined to give the sensed temperature used to control the flow of coolant through the hot and cold inlets 21 and 22. The sensed temperature is equal to $X*T_1+Y*T_2$ where X is between 0.75 and 0.95, Y is between 0.25 and 0.05, $T_1$ is the temperature of the coolant in the hot inlet and $T_2$ is the temperature of the coolant in the cold inlet. In the embodiment described, the positioning of the second valve 50 is such that the sensed temperature is equal to $0.9T_1+0.1T_2$.

Thus when the engine 10 is started from cold the coolant in the primary cooling circuit is at ambient temperature which, in most situations, means that the temperature of the coolant is between 0° C. and 25° C. Under these circumstances there is a likelihood that the passenger compartment heater 16 may be required for use and so the main thermostat 18 is operable to prevent the flow of coolant through the main cooler of the radiator 11 and the oil cooler mixer valve 20 is operable to prevent the flow of coolant through the hot and cold inlets 21, 22 to the outlet 23 so that no coolant flows through the secondary circuit and in particular through the sub-cooler 12. This gives a rapid warm up for the engine 10 to minimize emissions and maximize fuel economy and allows most of the heat generated by the engine to be used by the heater 17.

In the present example, the flow through the main cooler 11A of the radiator 11 is prevented by the primary flow control valve until the temperature of the coolant leaving the engine is approximately 95° C. The flow of coolant through the secondary circuit is also prevented until the temperature of the combined temperature of the coolant in the two inlets 21, 22 reaches the pre-determined temperature, in this case approximately 80° C. As has been described, the temperature of the coolant in the hot and cold inlets 21 and 22 is combined in a 0.9 to 0.1 ratio and so with a 20° C. ambient the temperature of the coolant leaving the engine will approach 87° C. before the first pre-determined temperature is reached in the oil cooler mixer valve 20.

When this first pre-determined temperature is exceeded but below the second higher pre-determined temperature, in this case 85° C., the oil cooler mixer valve 20 continues to prevent coolant flow through the sub-cooler 12 by preventing any significant flow through the cold inlet 22 but gradually increases the amount of coolant allowed to flow through the radiator bypass line RBL by gradually allowing coolant to flow from the hot inlet 21 to the outlet 23 of the oil cooler mixer valve 20. During this period warmed coolant is passed through the transmission oil cooler 16 and heats the oil flowing through the oil cooler. This speeds up the warming of the transmission and reduces its drag. By the time the combined coolant temperature has reached 80° C., sufficient heat will have been provided to the cabin heater 17 and the coolant temperature is sufficient to maintain a comfortable passenger compartment environment.

When the coolant temperature exceeds the second pre-determined temperature but is less than the third pre-determined temperature, in this case 90° C., flow through the cold inlet 22 commences but flow through the hot inlet 21 is also maintained. The temperature of the coolant leaving the oil cooler mixer valve 20 through the outlet 23 is then a mixture of the hot and cold coolant flows through the hot and cold inlets 21 and 22. As the temperature of the coolant continues to increase during this period, an increasing flow of coolant is allowed through the sub-cooler 12 to mix with the warmed coolant entering the oil cooler mixer valve 20 through the hot inlet 21. Finally, when the coolant reaches the third pre-determined temperature, the flow through the hot inlet 21 is cut off so that only cooled coolant that has passed through the sub-cooler 12 is transferred to the oil cooler 16 from the outlet 23. This provides maximum cooling for the oil cooler 16 as coolant of the lowest possible temperature is supplied. In fact, a very small flow of hot coolant is permitted to flow so as to maintain control of the oil cooler mixer valve 20 based primarily upon the temperature in the hot inlet 21. This flow is so small that it has negligible effect on the performance of the oil cooler 16.

When the coolant exceeds the third pre-determined temperature, maximum cooling is required for the engine 10 and the oil cooler 16 is then in need of cooled coolant to maintain the transmission cool rather than heat it. In fact, because of the very large thermal inertia of the transmission, the effect of the oil cooler 16 is to extract a considerable amount of heat from the coolant and so delay both the opening of the main thermostat 18 and the closing of the hot inlet 21 for a considerable period of time after engine start up. It will be appreciated that any heat dissipated from the radiator 11 is a waste of energy and so delaying the opening of the main thermostat 18 increases the overall energy efficiency of the vehicle by using the heat rejected by the engine 10 in a useful manner to heat the transmission and thereby reduce its drag.

In order to provide a failsafe mechanism should the thermostat capsule 30 fail or if excessive pressure is generated in the hot inlet 21, the valve spool 41 is arranged to open when the pressure in the hot inlet 21 exceeds a pre-determined magnitude. Since the inner diameter of the end face 61 of the retainer member 60 is larger than the bore 26 where the valve spool 41 slides, there is a difference in effective areas open to the pressure difference between the hot inlet 21 and the outlet 23 which is reacted by the preload of spring 43. When the force generated exceeds the preload, the valve spool 41 can move against the spring 43 and allow coolant to flow between the annular end faces 47 and 61 and escape through the outlet 23. This is the situation shown in FIG. 5. Thus the use of two springs 33, 43 in parallel is advantageous in that the spring 43 used to act against the valve spool 41 can be optimized to perform its pressure relieving function and the other spring can make up the difference in force required to act against the thermostat capsule 30.

Although the temperature in the cold inlet 22 has only a small effect, it is important in determining the operational positioning of the first and second valve members 40 and 50 and enables the oil cooler mixer valve 20 to take into account variations in the ambient temperature which will be relevant to when the oil cooler mixer valve 20 is required to allow flow in through the hot inlet 21. For example, if the ambient temperature (and hence the starting temperature of the coolant in the radiator) is 20° C., then the sensed temperature with a coolant temperature of 90° C. would be 83° C. whereas, if the ambient temperature is −10° C., then the sensed temperature with the same engine coolant temperature would be 80° C. In the one case hot coolant is able to flow in through the hot inlet 21 and in the other case it is not.

Figure 8:
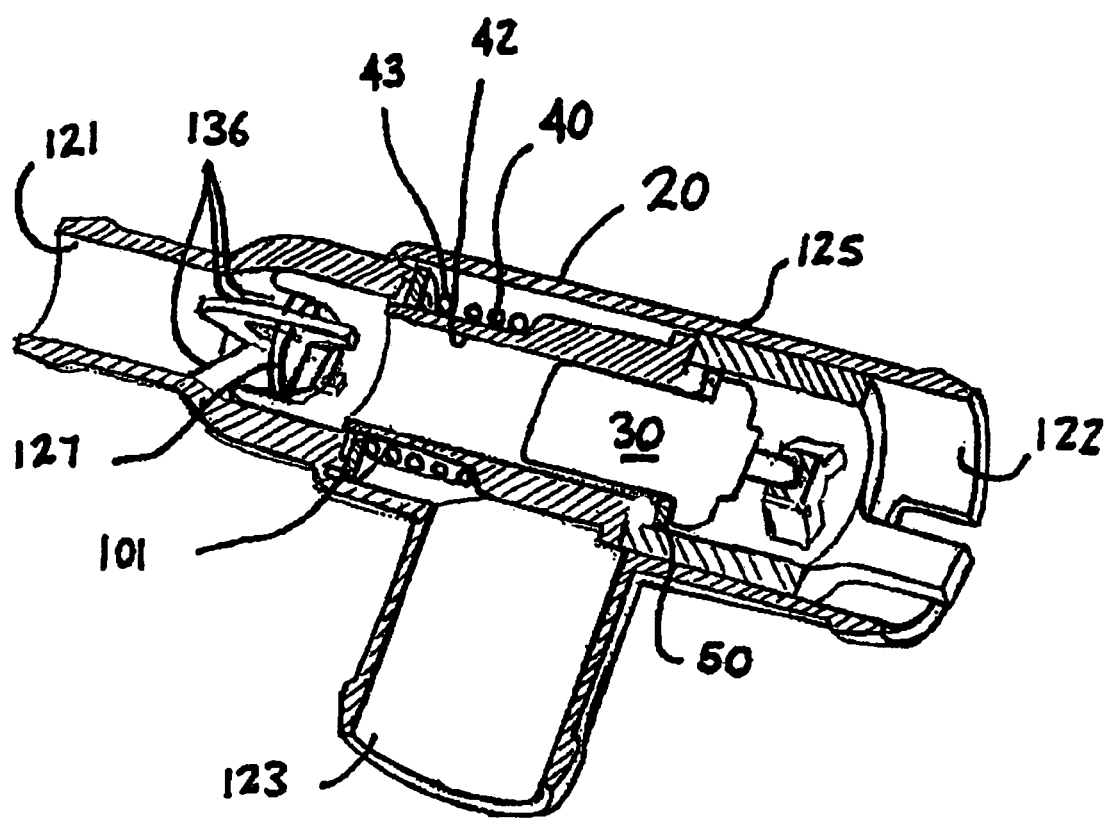
FIG. 8 is a cutaway perspective view of a temperature responsive control valve similar to that shown in FIGS. 2 to 7 but including a modification.

In most respects the modified oil cooler mixer valve 20 shown in FIG. 8 is identical to that previously described, as is its function, and these common aspects will not be described again in detail. As before, the oil cooler mixer valve 20 comprises a housing 125 in which is housed a valve spool 41 having a bore 42 and a second valve member 50 fastened to a thermostat capsule 30. There is, as before, a first or hot inlet 121 and a second or cold inlet 122 which are both connected to a common outlet 123.

The primary difference between this control valve and that previously described is that the diameter of the hot inlet 121 is much smaller than that of the previously described valve, typically 18 mm rather than 30 mm in the example described previously. An annular abutment member or washer 101 is used to react the load of the spring 43 used to bias the valve spool 41 instead of reacting this directly against the inner wall of the housing. In FIG. 8, the spring between the temperature responsive member and the housing has been omitted for clarity. The spring 43 for the valve spool 41 is interposed between the annular abutment member 101 and a step in the body forming the valve spool 41. Four spokes or webs 136 are moulded as part of the housing 125 to support a plug in the form of a disc 127 used to selectively seal off the bore 42 of the first valve member as previously described. The spring for the thermostat capsule 30 is interposed between the thermostat capsule 30 and the plug 127. As before, the valve 20 is operable to shut off both hot and cold flows, shut off cold but allow hot flow, allow mixed flow and shut off hot and allow cold flow depending upon the sensed temperature of the coolant. An additional advantage of this modified example is that the annular abutment member 101 can act as a secondary over-pressure valve if the pressure in the hot inlet 121 exceeds a predetermined magnitude.

In a further modification the capsule body 31 is used to form the second valve member and the annular brass ring 50 is omitted.

The invention claimed is:

1. An engine cooling system comprising:
 a primary cooling circuit having:
 a pump for pumping liquid coolant to an engine;
 an engine return line for coolant returned from the engine;
 a radiator having a inlet side and an outlet side;
 a bypass; and
 a primary flow control valve and a pump return line, the primary flow control valve and the bypass being connected in parallel with the radiator inlet side and the bypass connected to the engine return line, the radiator outlet side and the bypass connected to the primary flow control valve and the primary control valve being operative to control flow as between the radiator and the bypass to allow fluid to flow from the radiator only when the sensed temperature of the coolant is above a normal running temperature of the engine;
 a secondary cooling circuit having a heat exchanger and a temperature responsive control valve, the heat exchanger being connected to the pump return line and to the temperature responsive control valve and the temperature responsive control valve having a first inlet connected to the engine return line upstream from the radiator, a second inlet connected to the outlet side of the radiator and an outlet which is connected to the heat exchanger; and
 a heater circuit comprising a passenger compartment heater connected to receive coolant heated by the engine and return it to the pump return line;
 the temperature responsive control valve being operable, depending upon the sensed temperature of the coolant, to shut off flow through both of the inlets simultaneously, to shut off flow through the first inlet while permitting flow through the second inlet and to shut off flow through the second inlet while permitting flow through the first inlet.

2. The cooling system of claim 1 wherein control of the flow of coolant through the first and second inlets of the temperature responsive flow control valve is based on a sensed temperature which is combination of the temperatures of the coolant in the first and second inlets.

3. The cooling system of claim 2 wherein the temperature of the coolant in the first inlet is dominant in the control of coolant through the first and second inlets at all times.

4. The cooling system of claim 2 wherein the sensed temperature is equal to $X*T_1+Y*T_2$ where X is between 0.75 and 0.95, Y is between 0.25 and 0.05, $T_1$ is the temperature of the coolant in the first inlet and $T_2$ is the temperature of the coolant in the second inlet.

5. The cooling system of claim 1 wherein, when the sensed temperature is below a first predetermined temperature, the temperature responsive control valve is operable to shut off flow from the first and second inlets to the outlet.

6. The cooling system of claim 5 wherein, when the sensed temperature is above the first pre-determined temperature but below a second higher pre-determined temperature, the temperature responsive control valve is operable to permit coolant to flow from the first inlet to the outlet while preventing any significant flow from the second inlet to the outlet.

7. The cooling system of claim 6 wherein, when the sensed temperature is above the second pre-determined temperature but below a third higher pre-determined temperature, the temperature responsive control valve is operable to allow coolant to flow from the first inlet and the second inlet to the outlet.

8. The cooling system of claim 7 wherein, when the sensed temperature is above the third pre-determined temperature, the temperature responsive control valve is operable to prevent any significant flow from the first inlet to the outlet while allowing coolant to flow from the second inlet to the outlet.

9. The cooling system of claim 5 wherein the first pre-determined temperature is lower than the normal running temperature of the engine.

10. The cooling system of claim 6 wherein the third pre-determined temperature is below or equal to the normal running temperature of the engine.

11. The cooling system of claim 1 wherein the temperature responsive control valve is operable to allow coolant to flow from the first inlet to the outlet irrespective of the sensed temperature if the pressure difference between the first inlet and the outlet exceeds a pre-determined magnitude.

12. The cooling system of claim 1 wherein the temperature responsive control valve comprises a housing defining the first inlet, the second inlet, the outlet, a valve chamber, a temperature responsive member in the valve chamber, a first valve member for controlling the flow of coolant through the first inlet and a second valve member for controlling the flow of coolant through the second inlet.

13. The cooling system of claim 12 wherein the first valve member is axially moveable between two limits so that at or near one limit of axial movement it is operable to prevent coolant flow from the first inlet to the outlet, at or near the other limit of axial movement it is operable to prevent coolant flow from the first inlet to the outlet but for the majority of the axial movement between these limits it is arranged to permit coolant to flow from the first inlet to the outlet.

14. The cooling system of claim 13 wherein the first valve member is biased towards the second inlet.

15. The cooling system of claim 12 wherein the first valve member is a tubular member having a bore defining a coolant flow passage for coolant from the first inlet.

16. The cooling system of claim 12 wherein the temperature responsive member has a valve body having the second valve member, a pushrod actuated by a temperature responsive means in the valve body and acting against an abutment in the second inlet, biasing means being provided to bias the second valve member towards the second inlet.

17. The cooling system of claim 16 wherein the first valve member is a tubular member having a bore defining a coolant flow passage for coolant from the first inlet, the valve body being located in the bore of the tubular member.

18. The cooling system of claim 12 wherein a retainer member is secured in the housing adjacent the second inlet to retain the first valve member and the temperature responsive member within the valve chamber.

19. The cooling system of claim 18 wherein the retainer member defines a cylindrical bore in which the second valve member is a sliding fit, the arrangement being such that when the second valve member is fully engaged with the cylindrical bore no significant coolant flow can pass by the second valve member from the second inlet to the outlet.

20. The cooling system of claim 18 wherein the temperature responsive member has a valve body having the second valve member, a pushrod actuated by a temperature responsive means in the valve body and acting against an abutment in the second inlet, biasing means being provided to bias the second valve member towards the second inlet, the retainer member including a support member which forms the abutment for the pushrod.

21. The cooling system of claim 18 wherein the first valve member is a tubular member having a bore defining a coolant flow passage for coolant from the first inlet and the retainer member has an annular end face facing into the valve chamber for cooperation with a complementary annular end face on the tubular member, the arrangement being such that when the annular end face of the tubular member is in abutment with the annular end face of the retainer member no coolant can flow from the bore of the tubular member to the outlet.

22. The cooling system of claim 21 wherein spacers are interposed between the annular end face of the tubular member and the second valve member so as to define radial flow passages, the arrangement being such that when the annular end face of the tubular member is moved away from the annular end face of the retainer member coolant can flow from the bore of the tubular member through the radial passages to the outlet.

23. The cooling system of claim 22 wherein the spacers are in the form of projections formed around the inner perimeter of the annular end face of the tubular member.

24. The cooling system of claim 15 wherein the first inlet has a plug for engagement with the bore of the tubular member, the arrangement being such that, when the plug is engaged with the bore of the tubular member, no coolant can flow from the first inlet into the bore of the tubular member.

25. The cooling system of claim 24 wherein the temperature responsive member has a valve body having the second valve member, a pushrod actuated by a temperature responsive means in the valve body and acting against an abutment in the second inlet, and a biasing spring provided to bias the second valve member towards the second inlet, and located at one end by the plug.

26. The cooling system of claim 1 wherein the radiator has a main cooler and a sub-cooler both connected on an inlet side to the engine return line, the main cooler having an outlet side connected through a radiator return line to the primary flow control valve and the sub-cooler having an outlet side connected to the second inlet of the temperature responsive control valve.

27. The cooling system of claim 26 wherein, under full flow conditions, the pressure drop across the sub-cooler is considerable less than the pressure drop across the main cooler.

28. In an engine cooling system comprising a primary cooling circuit having a pump for pumping liquid coolant to an engine, an engine return line for coolant returned from the engine, a radiator having a inlet side and an outlet side, a bypass, a primary flow control valve and a pump return line, the primary flow control valve and the bypass being connected in parallel with the radiator inlet side and the bypass connected to the engine return line, the radiator outlet side and the bypass connected to the primary flow control valve and the primary control valve being operative to control flow as between the radiator and the bypass to allow fluid to flow from the radiator only when the sensed temperature of the coolant is above a normal running temperature of the engine, a secondary cooling circuit having a heat exchanger connected to the pump return line and to the engine return line upstream from the radiator, and a heater circuit comprising a passenger compartment heater connected to receive coolant heated by the engine and return it to the pump return line;

a temperature responsive control valve having a first inlet connected to the engine return line upstream from the radiator, a second inlet connected to the outlet side of the radiator and an outlet which is connected to the heat exchanger and being operable to shut off flow through both of the inlets simultaneously, to shut off flow through the first inlet while permitting flow through the second inlet and to shut off flow through the second inlet while permitting flow through the first inlet depending upon the sensed temperature of the coolant.

* * * * *